United States Patent [19]
Ito et al.

[11] 3,750,495
[45] Aug. 7, 1973

[54] CONTROL SYSTEM FOR AUTOMATIC TRANSMISSION

[75] Inventors: Shin Ito; Seitoku Kubo; Mashanao Hashimoto; Chihiro Hayashi, all of Toyota, Japan

[73] Assignee: Toyota Jidosha Kogyo Kabushiki Kaisha, Toyota-shi, Japan

[22] Filed: June 10, 1971

[21] Appl. No.: 151,851

[30] Foreign Application Priority Data
Aug. 6, 1970   Japan.............................. 45/68858

[52] U.S. Cl. .................................................. 74/866
[51] Int. Cl. ............................................. B60k 21/00
[58] Field of Search ........................................ 74/866

[56] References Cited
UNITED STATES PATENTS
3,665,779   5/1972   Mori ..................................... 74/866
3,572,168   3/1971   Shirai et al. ........................... 74/866

*Primary Examiner*—Leonard H. Gerin
*Attorney*—Cushman, Darby & Cushman

[57] ABSTRACT

A control system for an automatic transmission for an automotive vehicle having at least a torque converter, a planetary gear unit, brake bands and clutches actuated by hydraulic servos, a manual valve, shift valves, line pressure control means, detectors for a plurality of parameters indicative of the operating conditions of the engine, and discriminating circuits for carrying out an automatic shift from one speed ratio to another. In the system, an electrically operated shift shock control valve is provided to make an on-off operation in response to a timing control signal applied from a timing controller so as to alleviate the shift shock occurring during a shift from one gear position to another.

11 Claims, 18 Drawing Figures

3,750,495

CONTROL SYSTEM FOR AUTOMATIC TRANSMISSION

BACKGROUND OF THE INVENTION

1. Field of the Invention

This invention relates to fluid controlled automatic transmissions for automotive vehicles and more particularly to a control system comprising a combination of electrical and hydraulic means for use in such an automatic transmission.

2. Description of the Prior Art

Fluid controlled automatic transmissions for automotive vehicles are generally provided with a planetary gear unit and a plurality of hydraulic servo actuated frictional engaging means so as to obtain a suitable speed ratio by suitably engaging and disengaging these frictional engaging means. A change from one speed ratio to another is called a shift, and a so-called shift shock occurs during a shift due to a variation in the torque and the number of revolutions of the rotary members including the engine. In order to alleviate this shift shock and eliminate a slow or rough speed-changing motion thereby to provide a comfortable feeling in driving, it is desirable to engage and disengage the frictional engaging means with proper timing and at a suitable rate depending on the running conditions of the vehicle.

SUMMARY OF THE INVENTION

It is an object of the present invention to provide a control system for an automatic transmission for an automotive vehicle which comprises a unique combination of hydraulic and electrical control means for alleviating the undesirable shift shock and providing a comfortable feeling in driving due to the elimination of a slow and rough speed-changing motion.

Another object of the present invention is to provide a control system of the above character which comprises an electrically operated control valve for controlling fluid pressure supplied to the hydraulic servos and a timing controller for applying a suitable timing control signal to the electrically operated control valve to control the operation of this valve, depending on the running conditions of the vehicle thereby delicately controlling the rate of engagement and disengagement as well as the timing of engagement and disengagement of the frictional engaging means.

In accordance with one aspect of the present invention, there is provided, in an automatic transmission for an automotive vehicle, for transmitting torque between a driving shaft and a driven shaft, a control system comprising frictional engaging means provided with fluid pressure operated servo means and arranged for the transmission of torque between said driving and driven shafts, a source of fluid pressure for supplying fluid under pressure, for actuating said frictional engaging means, fluid passage means leading from said fluid pressure source to said frictional engaging means, fluid passage change-over valve means disposed in said fluid passage means for selectively distributing fluid under pressure to said frictional engaging means, signal generator means including at least a signal generator for generating an electrical signal responsive to the running conditions of the vehicle thereby controlling said fluid passage change-over valve means, fluid pressure control means for controlling the pressure of fluid supplied to said frictional engaging means through said fluid passage change-over valve means, and timing control means for generating an electrical signal for controlling the operation timing of said fluid pressure control means in response to the output signal delivered from said signal generator means, whereby said fluid pressure control means is subject to on-off control during a shift from one gear position to another which is followed by a variation in the torque being transmitted between said driving and driven shafts so as to control the fluid pressure supplied to said frictional engaging means thereby ensuring smooth transmission of the torque between said driving and driven shafts during the shift.

DESCRIPTION OF THE PREFERRED EMBODIMENTS

Figure 1:
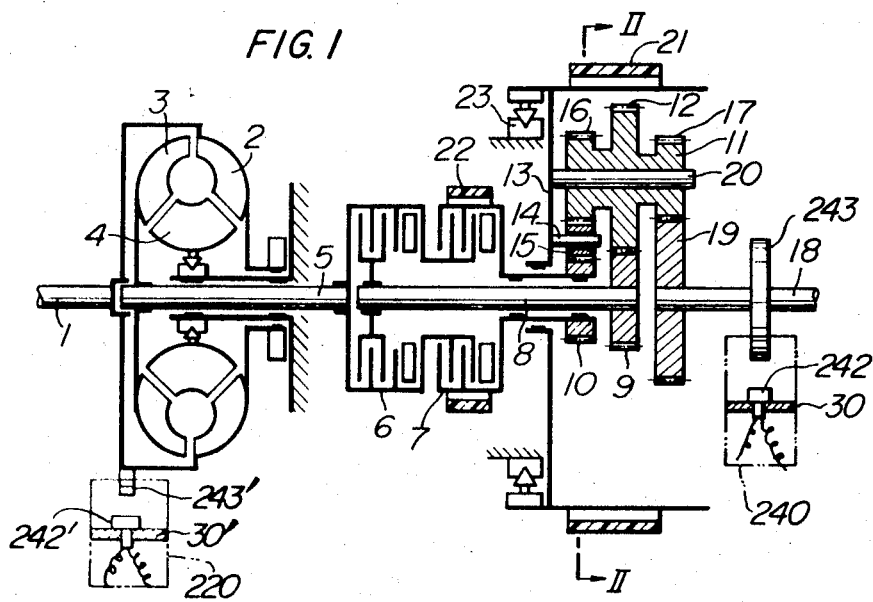
FIG. 1 is a schematic sectional view of an automatic transmission to which the present invention is applied.
Figure 2:
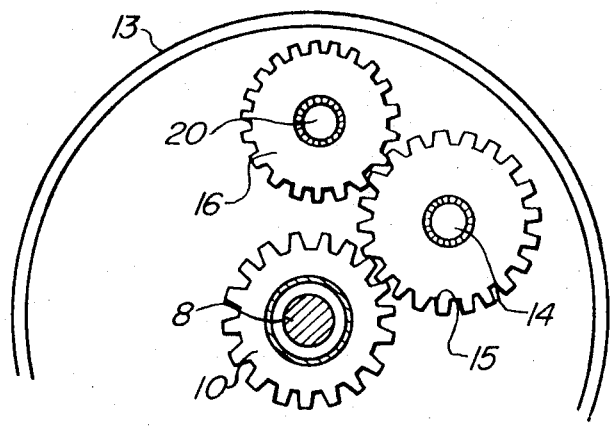
FIG. 2 is an enlarged sectional view taken on the line II—II in FIG. 1 with parts cut away to show in detail the relation between an idler gear not shown in FIG. 1 and the sun gear and planet pinion.
Figure 3:
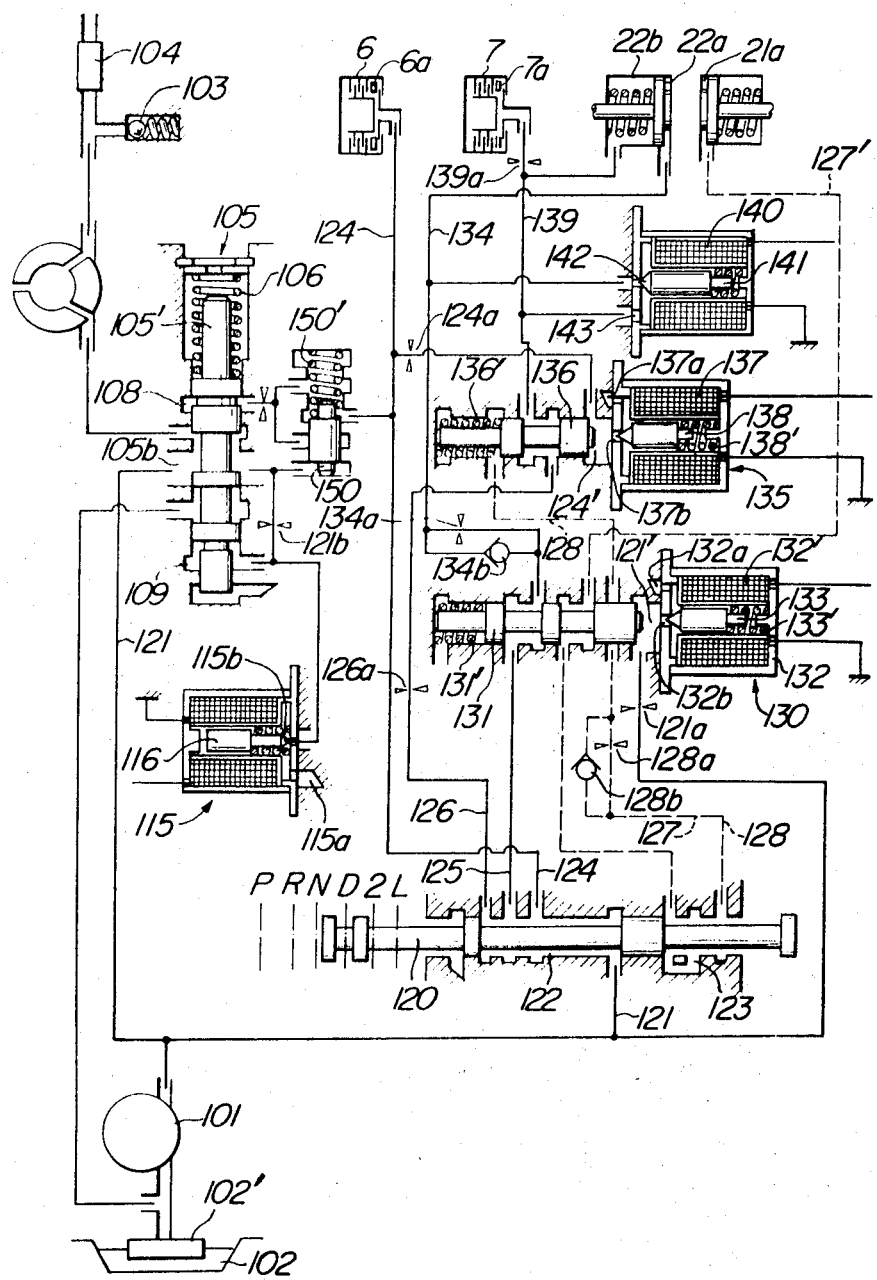
FIG. 3 is a diagrammatic view showing the structure of a hydraulic control section of a control system according to the present invention.
Figure 7A:
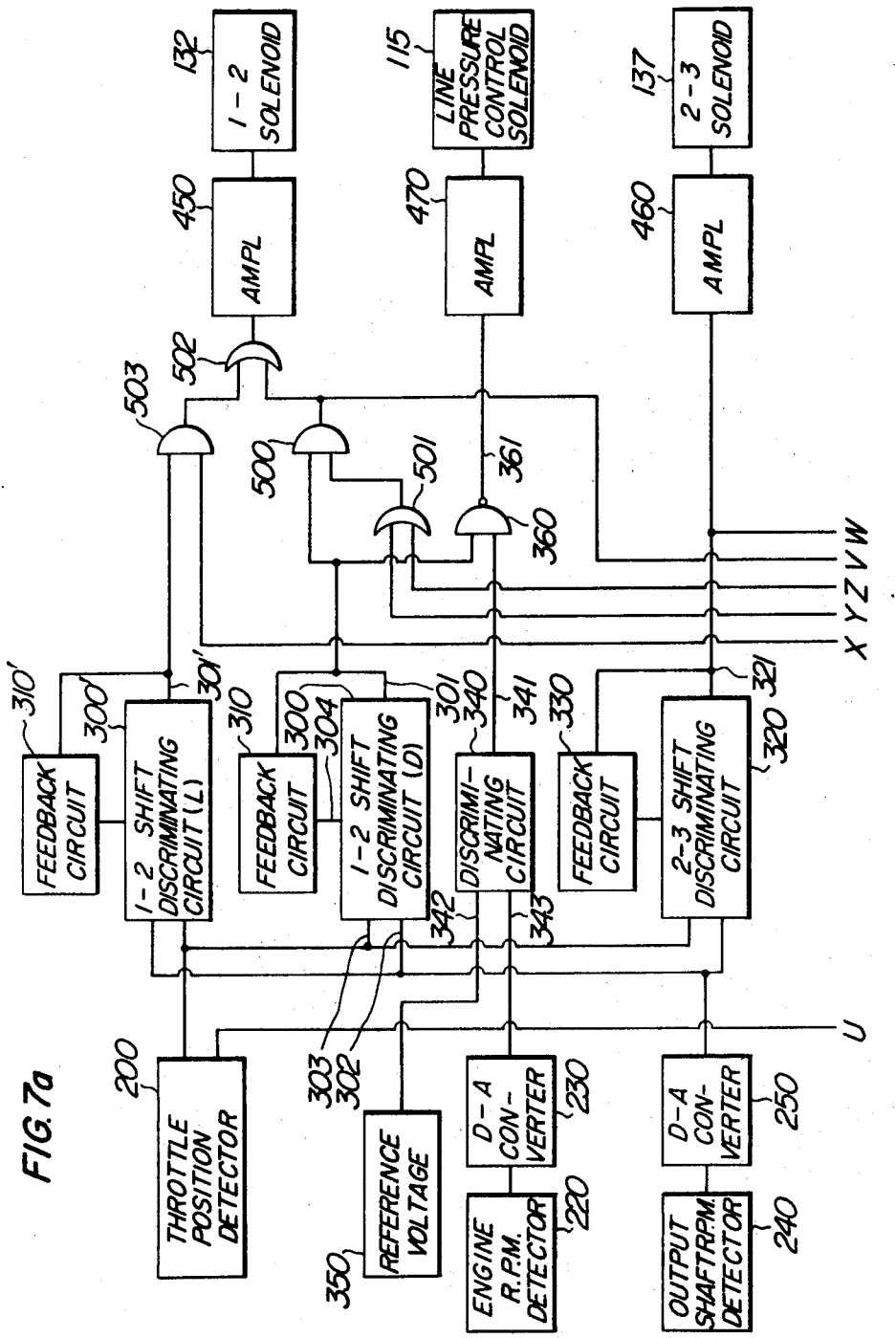
FIGS. 7a and 7b are a block diagram showing the structure of an electrical control section of the control system according to the present invention.
Figure 7B:
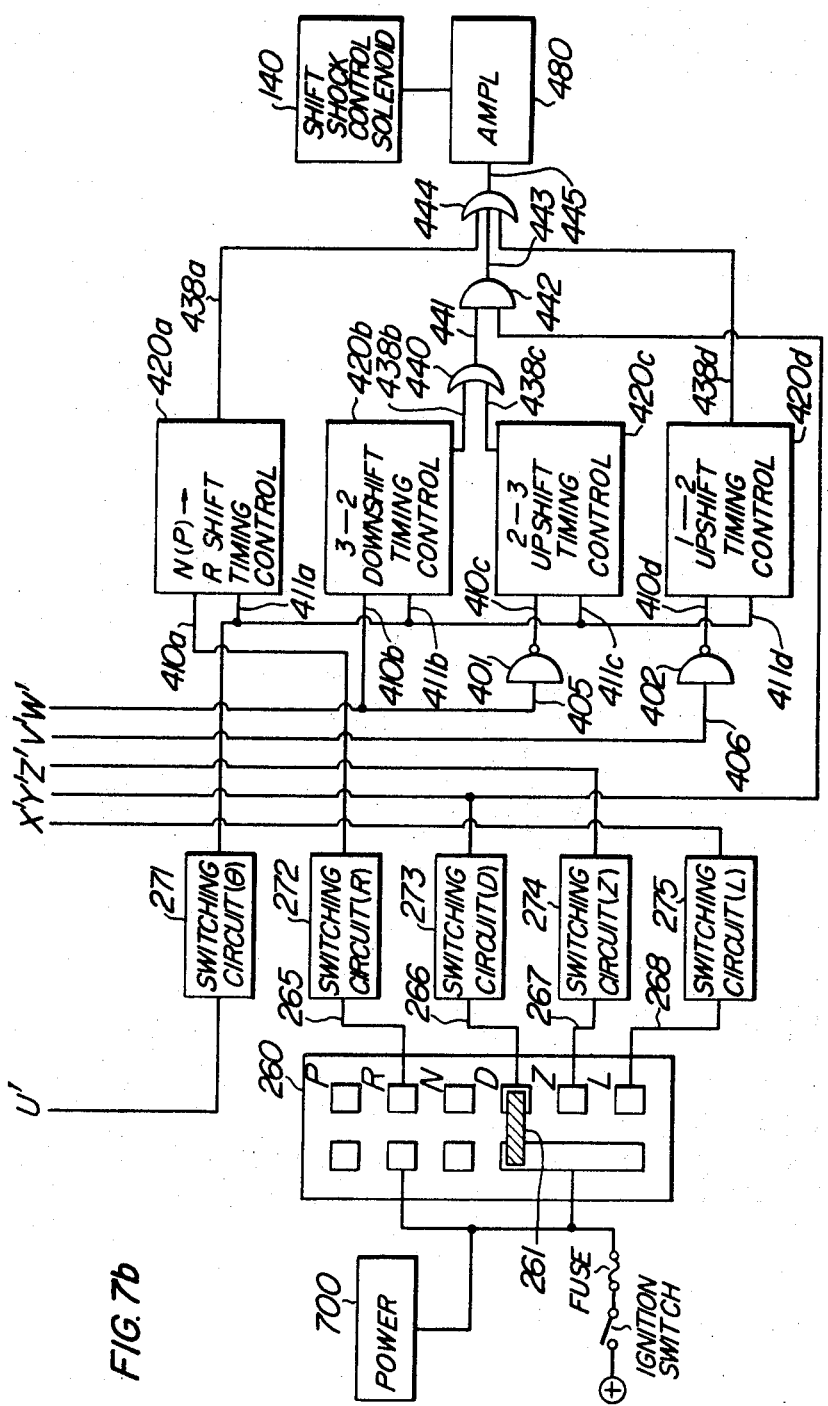

An automatic transmission controlled by a control system embodying the present invention is schematically shown in FIGS. 1 and 2. The control system comprises a hydraulic control section as shown in FIG. 3 and an electrical control section as shown in FIGS. 7a and 7b.

Referring to FIGS. 1 and 2, the transmission comprises a hydraulic torque converter unit and a planetary gear unit arranged to provide three forward speeds and one reverse speed. The torque converter unit is of known construction including a pump impeller 2, a turbine impeller 3 and a stator 4. The pump impeller 2 is directly connected to the crankshaft 1 of an engine, and the turbine impeller 3 is connected to a turbine shaft 5 so that a rotational force can be transmitted to the planetary gear unit disposed at the output side of the torque converter unit. The planetary gear unit includes two multiple disc clutch means and two brake band means released and engaged by associated hydraulic servo means, a spray type one-way clutch, and a planetary gear train composed of sun gears and planet pinions. The turbine shaft 5 is connected by means of a front clutch 6 to an intermediate shaft 8 carrying an input sun gear 9 thereon and is further connected to a reverse sun gear 10 by means of a rear clutch 7. A brake band means 22 (hereinafter to be referred to as a front brake band) encircles the rear clutch 7 for controlling the reverse sun gear 10 and is actuated by a hydraulic servo. The input sun gear 9 meshes with each gear 12 of a plurality of, for example, two or three planet pinions 11. The reverse sun gear 10 meshes with idler gears 15 (shown in FIG. 2) which are each rotatably mounted by a pin 14 fixed at one end to a carrier 13, and the idler gears 15 in turn mesh with gears 16 of the planet pinions 11. The rearmost gear 17 of each planet pinion 11 meshes with a gear 19 mounted at the front end of an output shaft 18 of the transmission. The planet pinions 11 having the gears 16, 12 and 17 and the idler gears 15 are carried by the carrier 13 by means of pinion pins 20 and 14 respectively. A brake band means 21 (hereinafter to be referred to as a rear brake band) encircles the carrier 13 for applying the brake to the latter and is actuated by a hydraulic servo. A spray type one-way clutch 23 is associated with the carrier 13 for restricting the rotation of the carrier 13 in one direction.

With the above structure, three forward speeds and one reverse speed can be obtained by selectively actuating the elements above described.

First speed — The front clutch 6 and the rear brake band 21 are actuated. (However, when the transmission is driven from the engine, the rear brake band 21 may not be actuated since the one-way clutch 23 is also actuated to give the same result as that obtained with the actuation of the rear brake band 21. In this case, however, no driving force is transmitted from the output shaft 18.) With the front clutch 6 and the rear brake band 21 so actuated, the rotation of the turbine shaft 5 is directly transmitted to the input sun gear 9 through the front clutch 6. Due to the fact that the carrier 13 is locked against rotation by the rear brake band 21, the pinion pins 20 are also held stationary and the rotation of the turbine shaft 5 is transmitted from the gear 9 to the gears 12, thence through the gears 17 to the gear 19 on the output shaft 18 in a speed reduction relation thereby providing the first speed.

Second speed — The front clutch 6 is kept actuated and the front brake band 22 is actuated while releasing the rear brake band 21. Thus, the input sun gear 9 is rotated in unison with the turbine shaft 5, but the rear clutch drum, hence the reverse sun gear 10 is locked against rotation by the front brake band 22. In this state, the rotation of the turbine shaft 5 is directly transmitted to the input sun gear 9 to rotate the latter and the reaction of the reverse sun gear 10 causes rotation of the carrier 13 in the same direction as the direction of rotation of the input sun gear 9 so that the gear 19, hence the output shaft 18, carrying the gear 19, is rotated at a reduced or second speed.

Third speed — The third speed can be obtained by engaging both the front and rear clutches 6 and 7. The input sun gear 9 and the reverse sun gear 10 are rotated in unison and the whole planetary gear system is unitarily rotated so that the turbine shaft 5 and the output shaft 18 are rotated in a 1 : 1 relationship.

Reverse — When reversing, the rear clutch 7 and the rear brake band 21 are actuated. The carrier 13, hence the pinion pins 14 and 20 are thereby locked against revolution, and the rotation of the turbine shaft 5 is transmitted through the rear clutch 7 to the reverse sun gear 10, thence through the idler gears 15 and the gears 16 and 17 of the planet pinions 11 to the gear 19 mounted on the output shaft 18 so that the output shaft 18 is rotated in the reverse direction.

Referring to FIG. 3, the hydraulic control section of the control system includes a hydraulic actuating circuit to which fluid under pressure is supplied by a pump 101 which may be a gear pump, vane pump or any other suitable pump. The pump 101 is driven by a shaft directly connected to the engine and draws the fluid from a fluid reservoir 102 through a fluid strainer 102' to discharge the fluid under pressure into a fluid passage 121. The fluid passage 121 leads to a pressure regulator valve 105 and a manual valve 120. The pressure regulator valve 105 is of a type conventionally employed in automatic transmissions for automotive vehicles and includes a spring 106 and a valve spool 105' disposed in the valve body. The valve spool 105' is provided with a plurality of different lands so as to carry out the pressure regulation by utilizing the balance between the force of the spring 106 and the fluid pressures applied to spaced valve chambers 108 and 109. The fluid pressure regulated by this pressure regulator valve 105 is called a line pressure. The fluid pressure applied to the valve chamber 108 is controlled by means of the manual valve 120 and a relay valve 150, while the fluid pressure applied to the valve chamber 109 is controlled by a line pressure control solenoid 115. The on-off control of the line pressure control solenoid 115 is accomplished by a signal applied from the electrical control section of the system depending on the driving conditions of the vehicle.

The manual valve 120 is connected with a shift lever (not shown) disposed adjacent to the driver's seat and takes one of the P, R, N, D, 2 and L positions. When the manual valve 120 takes anyone of the D, 2 and L positions, fluid under pressure is supplied to a fluid passage 124 and cooperates with a spring 150' engaging a valve element of the relay valve 150 to urge the valve element to its lower position so that the line pressure in the fluid passage 121 is applied to the upper valve chamber 108 of the pressure regulator valve 105. When the line pressure control solenoid 115 is energized in this state, a solenoid orifice 115b is closed by a plunger 116 and the line pressure is applied to the lower valve chamber 109 of the pressure regulator valve 105. Thus, the line pressure regulated by the pressure regulator valve 105 is represented by a constant low fluid pressure $P_{LL}$ which is determined by the force of the spring 106 and the fluid pressures applied to the valve chambers 108 and 109. On the other hand, when the line pressure control solenoid 115 is in the de-energized state, the solenoid orifice 115b is kept open and the fluid pressure in the lower valve chamber 109 of the pressure regulator valve 105 is discharged to a pressure discharge port 115a so that the line pressure regulated by the pressure regulator valve 105 is represented by a constant high fluid pressure $P_{LH}$ which is determined by the force of the spring 106 and the fluid pressure applied to the upper valve chamber 108 of the pressure regulator valve 105. In the P, R or N position of the manual valve 120, the fluid passage 124 is exhausted and the fluid pressure applied to the upper valve chamber 108 of the pressure regulator valve 105 is reduced by an amount which corresponds to the force of the spring 150' engaging the valve element of the relay valve 150. When, in this case, the line pressure control solenoid 115 is in the on state, the line pressure is applied to the lower valve chamber 109, while the fluid pressure which is reduced by the amount corresponding to the force of the spring 150' is applied to the upper valve chamber 108 of the pressure regulator valve 105. Thus, the line pressure regulated by the pressure regulator valve 105 is represented by a fluid pressure $P_{HL}$ which is higher than $P_{LL}$. On the other hand, when the line pressure control solenoid 115 is in its off state, the lower valve chamber 109 of the pressure regulator valve 105 is exhausted so that the line pressure regulated by the pressure regulator valve 105 is represented by a fluid pressure $P_{HH}$ which is higher than $P_{LH}$. The on-off control of the line pressure control solenoid 115 will be described in the later description relating to the electrical control section of the control system.

The fluid pressure regulated by the pressure regulator valve 105 is supplied to the manual valve 120. When the manual valve 120 takes the N position, the fluid passage 121 is closed and valve chambers 122 and 123 are exhausted. In the D position of the manual valve 120, the fluid passage 121 communicates with fluid passages 124, 125 and 126 as seen in FIG. 3. The fluid passage 124 leads directly to a front clutch servo chamber 6a, and the fluid passage 125 leads to the apply side 22a of a servo for the front brake band 22 through a 1-2 shift means 130, while the fluid passage 126 leads to a rear clutch servo chamber 7a and to the release side 22b of the servo for the front brake band 22 through a 2-3 shift means 135. When the manual valve 120 is urged to the 2 position, the fluid passage 126 leading to the 2-3 shift means 135 is exhausted and the fluid passages 124 and 125 communicate with the fluid passage 121. When the manual valve 120 is urged to the L position, the fluid passages 125 and 126 are exhausted and the fluid passages 124 and 127 communicate with the fluid passage 121. The fluid passage 127 leads to the apply side 22a of the servo for the front brake band 22 through the 1-2 shift means 130 and a fluid passage 134 and leads further to the apply side 21a of a servo for the rear brake band 21 through the 1-2 shift means 130 and a fluid passage 127'. When the manual valve 120 is moved to the R position, the fluid passages 124, 125 and 126 are exhausted and the fluid passages 127 and 128 communicate with the fluid passage 121. The fluid passage 128 leads to the rear clutch servo chamber 7a through the 2-3 shift means 135.

The 1-2 shift means 130 comprises a 1-2 shift valve element 131, a 1-2 shift solenoid 132, and a spring 131' engaging the valve element 131. The 1-2 shift solenoid 132 includes a plunger 133, a spring 133' and a coil 132'. Fluid under pressure is supplied from the fluid passage 121 through an orifice 121a to a chamber 121' disposed between the right-hand end of the 1-2 shift valve element 131 and the 1-2 shift solenoid 132. The 1-2 shift solenoid 132 is controlled by a signal applied from the electrical control section of the system. When no current is supplied to the 1-2 shift solenoid 132, the plunger 133 is kept in its leftward (extended) position by the force of the spring 133' thereby closing a solenoid orifice 132b so that the 1-2 shift valve element 131 is urged to its leftward (retracted) position by fluid pressure in the chamber 121'. When current is supplied to the 1-2 shift solenoid 132, the plunger 133 is urged to its rightward (retracted) position by the electromagnetic force and fluid under pressure in the chamber 121' is discharged to a pressure discharge port 132a through the solenoid orifice 132b. The diameter of the orifice 121a is selected to be significantly smaller than that of the orifice 132b so that any substantial residual pressure may not exist in the chamber 121' when the 1-2 shift solenoid 132 is energized. Thus, the 1-2 shift valve element 131 is urged to its rightward (extended) position by the force of the spring 131'.

The 2-3 shift means 135 comprises a 2-3 shift valve element 136, a spring 136' engaging the valve element 136, and a 2-3 shift solenoid 137. The structure of the 2-3 shift solenoid 137 is the same as that of the 1-2 shift solenoid 132. Fluid under pressure is supplied from the fluid passage 124 through an orifice 124a to a chamber 124' disposed between the right-hand end of the 2-3 shift valve element 136 and the 2-3 shift solenoid 137. The diameter of the orifice 124a is selected to be smaller than that of solenoid orifice 137b. When current is supplied to the 2-3 shift solenoid 137, fluid under pressure in the chamber 124' is discharged to a pressure discharge port 137a through the orifice 137b so that the 2-3 shift valve element 136 is urged to its rightward (extended) position by the force of the spring 136'. When no current is supplied to the 2-3 shift solenoid 137, the solenoid orifice 137b is kept closed by the solenoid plunger 138 and the 2-3 shift valve element 136 is urged to its leftward (retracted) position by fluid pressure in the chamber 124'.

It will be seen from the above description that the hydraulic servos in the transmission are selectively actuated to determine the gear position during driving depending on the positions of the manual valve 120, 1–2 shift valve element 131 and 2–3 shift valve element 136. Table 1 shows the relation between the position of the manual valve 120, the on-off state of the 1–2 and 2–3 shift solenoids 132 and 137, the gear position during driving, and the operating state of the hydraulic servos.

TABLE 1

| Position of manual valve | | 1-2 solenoid | 2-3 solenoid | Front clutch | Rear clutch | Front brake band | Rear brake band | One-way clutch |
|---|---|---|---|---|---|---|---|---|
| D | 1st speed | on | on | O | X | X | X | O |
| D | 2nd speed | off | on | O | X | O | X | X |
| D | 3rd speed | off | off | O | O | X | X | X |
| 2 | 1st speed | on | | O | X | X | X | O |
| 2 | 2nd speed | off | | O | X | O | X | X |
| L | 1st speed | off | | O | X | X | O | (O) |
| L | 2nd speed | on | | O | X | O | X | X |
| R | | off | off | X | O | X | O | X |

It will be seen from Table 1 that the 1–2 shift solenoid 132 is on or energized in the D position-1st speed, 2 position-1st speed and L position-2nd speed and is off or de-energized in the D position-2nd speed, D position-3rd speed, 2 position-2nd speed, L position-1st speed and R position, while the 2–3 shift solenoid 137 is on or energized in the D position-1st speed, D position-2nd speed and is off or de-energized in the D position-3rd speed and R position. In the 2 and L positions of the manual valve 120, the 2–3 shift solenoid 137 does not participate in the control operation since the fluid passage 126 is exhausted in such positions regardless of the energization or de-energization of the solenoid 137 and no fluid is supplied to the rear clutch servo chamber 7a or to the release side 22b of the servo for the front brake band 22. Further, in the R position of the manual valve 120, the 2–3 shift solenoid 137 does not participate in the control operation since the fluid passage 124 is exhausted in such position, to exhaust the chamber 124' regardless of the energization and de-energization of the solenoid 137 with the result that the 2–3 shift valve element 136 is urged to its rightward position and the fluid passage 128 communicates with a fluid passage 139. The symbols O and X show that a specific hydraulic servo is in operation and not in operation respectively. In the L position-1st speed, the one-way clutch 23 becomes engaged upon the operation of the engine to apply a driving force to the output shaft of the transmission. Further, as will be apparent from Table 1, the vehicle is running at the L position-1st speed, 2 position-2nd speed and D position-3rd speed. When no current is supplied to both the 1–2 and 2–3 shift solenoids 132 and 137, that is, when both these solenoids are in the off state. Thus, the vehicle can run unhindered even when no current is supplied to these solenoids due to trouble occurred in the electrical control section of the system.

A shift shock control solenoid 140 is provided to connect and disconnect the fluid passage 134 leading from the 1–2 shift means 130 to the apply side 22a of the servo for the front brake band 22 with the fluid passage 139 leading from the 2–3 shift means 135 to the release side 22b of the servo for the front brake band 22 and to the rear clutch servo chamber 7a. The solenoid 140 has a structure similar to that of the 1–2 shift solenoid 132. When current is supplied to the solenoid 140, the fluid passage 134 is connected with the fluid passage 139 through an orifice 142, and when no current is supplied to the solenoid 140, the orifice 142 is closed by a plunger 141 to interrupt the connection between the fluid passages 134 and 139.

In response to the movement of the shift valve elements in the manner above described, fluid is supplied to or discharged from the apply and release sides 22a and 22b of the servo for the front brake band 22 and to or from the rear clutch servo chamber 7a to engage or disengage the brake band and clutch thereby to shift the gear position. In this case, a so-called shift shock occurs due to a variation in the torque and revolutions of the members of the transmission and the engine. This shift shock can be alleviated by controlling the engaging or disengaging rate and the engaging or disengaging timing of the clutch and brake band. In response to a signal applied from the electrical control section of the system, the shift shock control solenoid 140 controls the rate of increase or decrease in the servo fluid pressure or fluid pressure in the fluid passages 139 and 134 during the shift so as to control the engaging rate and timing of the clutch and brake band for ensuring a smooth shift. The rate of increase or decrease in the servo fluid pressure can be controlled by various methods including a method in which the current supplied to the pressure regulating solenoid is varied to cause oscillation of the solenoid thereby controlling the leakage. In the present invention, a simpler method is employed in which an increase in the servo fluid pressure when a constant amount of fluid is allowed to leak through the orifice 142 is suitably combined with an increase in the servo fluid pressure when no fluid is allowed to leak through the orifice 142 so as to obtain the optimum increase in the servo fluid pressure for ensuring a smooth shift. The shift shock control solenoid 140 is capable of alleviating the shift shock occurring during an upshift from the first to second speed (hereinafter to be referred to as 1–2 upshift), an upshift from the second to third speed (hereinafter to be referred to as a 2–3 upshift), a downshift from the third to second speed (hereinafter to be referred to as a 3–2 downshift), and a shift from the neutral or N position to the reverse or R position (hereinafter to be referred to as an N-R shift).

The operation of the shift shock control solenoid 140 during these shifts will now be described.

1–2 upshift

Figure 4:
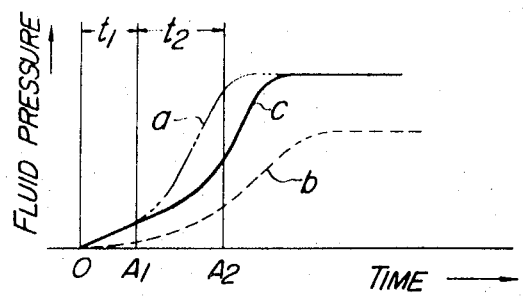
FIG. 4 is a chart showing the manner of increase relative to time of the fluid pressure supplied to hydraulic servos during a shift when the fluid pressure is controlled by a solenoid operated control valve.

In the first speed position, the front clutch 6 and one-way clutch 23 are actuated, while in the second speed position, the front brake band 22 is engaged. In order to carry out this shift smoothly, the front brake band 22 is preferably engaged at a suitable rate. FIG. 4 shows an increase relative to time of the servo fluid pressure or fluid pressure applied through the fluid passage 134 to the apply side 22a of the servo for the front brake band 22 during the 1–2 upshift. When no current is supplied to the shift shock control solenoid 140, the fluid flow is limited by an orifice 134a so that fluid pressure increases along the curve a. In response to the supply of current to the shift shock control solenoid 140, the fluid passage 134 communicates with the fluid passage 139 through the orifice 142. Since the 2–3 shift solenoid 137 is energized and the 2–3 shift valve element 136 is biased to its rightward position in the second speed position, the fluid passage 139 communicates with the fluid passage 128 and is exhausted through an orifice 128a and a check valve 128b in the fluid passage 128 and through the manual valve 120. Therefore, the fluid pressure in the fluid passage 134 leading to the apply side 22a of the servo for the front brake band 22 increases slowly as shown by the curve b in FIG. 4. The rate of increase in the fluid pressure can be regulated by suitably selecting the size or diameter of the orifices 134a and 142. It is therefore possible to obtain a curve c which is intermediate between these two curves a and b and gives a preferred rate of increase in the fluid pressure by suitably energizing and de-energizing the shift shock control solenoid 140 after the 1–2 shift valve element 132 has been urged to the leftward (extended) position in response to the shift signal. Generally, premature engagement of the clutch and brake band results in a large shift shock and in a reduction of the service life of the linings of the clutch and brake band due to an increase in the amount of energy absorbed by the clutch and brake band linings per unit time. Also, when the clutch and brake band are engaged too late, a similar reduction in the service life of the linings results from the speeding up of the engine, an uncomfortable feeling and an increase in the amount of energy absorbed by the linings per unit time. It is therefore necessary to engage the clutch and brake band at a suitably controlled rate which is neither too early nor too late. The curve c in FIG. 4 shows a moderate rate of increase in the fluid pressure. More precisely, the shift shock control solenoid 140 is kept in the de-energized state for a period of time $t_1$ starting from the point 0 at which the shift signal was applied to the 1–2 shift means 130 until a point $A_1$ is reached. At this point $A_1$, the shift shock control solenoid 140 is energized and is kept in such state for a period of time $t_2$ until a point $A_2$ is reached. At this point $A_2$, the shift shock control solenoid 140 is de-energized again and is kept in such state thereafter. A very smooth shift can be carried out when the periods of time $t_1$ and $t_2$ in this curve c are controlled so that the engagement of the front brake band 22 is started in the vicinity of the point $A_1$ and is ended to complete the shift in the vicinity of the point $A_2$. The number of on-off cycles of the shift shock control solenoid 140 may be increased when a more complex curve is required to carry out a smooth shift. Further, the 1–2 upshift can be attained smoothly under all the driving conditions of the vehicle by varying the points $A_1$ and $A_2$, hence the periods of time $t_1$ and $t_2$ depending on the driving conditions such as, for example, the engine torque, vehicle speed and temperature of lubricating oil. The on-off control of the shift shock control solenoid 140 will be described in detail in the later description relating to the electrical control section of the control system. Where suitable change-over between the curves a and b, hence the on-off of the shift shock control solenoid 140 solely cannot give a satisfactory rate of increase in the fluid pressure in certain driving conditions, an orifice control valve actuated by the shift shock control solenoid 140 may be put into the fluid passage 134 and associated with a plurality of orifices so as to selectively direct fluid flow through all or one of these orifices as will be described later.

2–3 upshift

Figure 5:
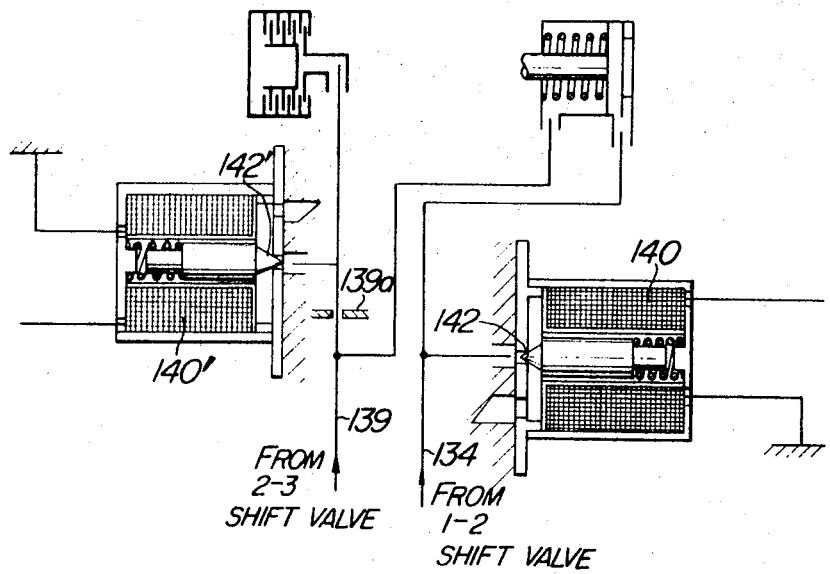
FIG. 5 is a diagrammatic view showing a partial modification of the arrangement shown in FIG. 3, in which two solenoid operated control valves are used to control the rate of increase in the fluid pressure supplied to the hydraulic servos.

In an upshift from the second to third speed, the 1–2 shift valve element 131 is kept in its leftward (retracted) position and the 2–3 shift valve element 136 is urged to its leftward (retracted) position to release the front brake band 22 and engage the rear clutch 7. In this case, the control of the disengaging timing of the front brake band 22, the engaging timing of the rear clutch 7 and the rate of engaging the rear clutch 7 is important in order to carry out the 2–3 upshift smoothly. In the de-energized state of the shift shock control solenoid 140, fluid under pressure is supplied to the fluid passage 139 through the orifice 126a. However, in response to the energization of the shift shock control solenoid 140, the fluid passage 139 communicates with the fluid passage 134 so that fluid is also supplied to the fluid passage 139 from the fluid passage 134, and at the same time, fluid flowing through the fluid passage 134 to be supplied to the apply side 22a of the servo for the front brake band 22 leaks through the orifice 142 and thus fluid pressure is reduced to a suitable level corresponding to the fluid pressure in the fluid passage 139. Therefore, the fluid pressure in the fluid passage 139 to be supplied to the release side 22b of the servo for the front brake band 22 is lower in the energized state of the solenoid 140 than when the solenoid 140 is in the de-energized state, and the front brake band 22 is disengaged by such a lower fluid pressure. In this manner, the timing of the engaging of the rear clutch 7 and the timing of the disengaging of the front brake band 22 can be varied. The timing can be varied by suitably energizing and de-energizing the shift shock control solenoid 140 after the application of a 2–3 upshift signal as in the case of the 1–2 upshift. That is, a smooth 2–3 upshift can be attained by the on-off control of the shift shock control solenoid 140 thereby varying the rate of decrease in the fluid pressure supplied to the apply side 22a of the servo for the front brake band 22, the rate of increase in the fluid pressure supplied to the release side 22b of the servo for the front brake band 22, and the rate of increase in the fluid pressure supplied to the rear clutch servo chamber 7a. In an arrangement shown in FIG. 5, two shift shock control solenoids 140 and 140' are associated with the fluid passages 134 and 139 respectively for controlling the rate of decrease in the fluid pressure supplied to the apply side 22a of the servo for the front brake band 22 and the rate of increase in the fluid pressure supplied to the rear clutch servo chamber 7a independently of each other. By this arrangement, the engage timing of the rear clutch 7, the disengage timing of the front brake band 22 and the rate of engaging the rear clutch 7 can be more accurately controlled than the arrangement shown in FIG. 3.

3–2 downshift

In a downshift from the third to second speed, the 2–3 shift valve element 136 is urged to its rightward position from the third speed position to exhaust the fluid passage 139 leading to the release side 22b of the servo for the front brake band 22 and to the rear clutch servo chamber 7a, and the piston in the front brake band 22 is urged to the engaging position. In this case too, the fluid passage 134 communicates with the fluid passage 139 in response to the energization of the shift shock control solenoid 140 and fluid leaks through the orifice 142 so that the engage timing of the front brake band 22 can be suitably delayed relative to the disengage timing of the rear clutch 7 and the front brake band 22 can be engaged at a moderate rate. Thus, the front brake band 22 can be engaged at a suitable rate with suitable timing and the rear clutch 7 can be disengaged with suitable timing depending on the on-off control of the shift shock control solenoid 140 thereby attaining a smooth 3-2 downshift.

N-R shift

In reversing, the rear brake band 21 and the rear clutch 7 are actuated. The fluid passage 139 leading to the rear clutch servo chamber 7a communicates with the fluid passage 134 in response to the energization of the shift shock control solenoid 140. In the R position of the manual valve 120, the fluid passage 134 is exhausted through the orifice 134a, check valve 134b and fluid passage 125. Therefore, in the energized state of the shift shock control solenoid 140, fluid flowing through the fluid passage 139 leaks through the orifice 142 and fluid pressure supplied to the rear clutch servo chamber 7a by way of the fluid passage 139 increases at a moderate rate. That is, the rear clutch servo pressure can be increased at a suitable rate and the N-R shift can be attained smoothly when the shift shock control solenoid 140 is energized and de-energized after the N-R shift as in the case of the 1-2 upshift.

Figure 6A:
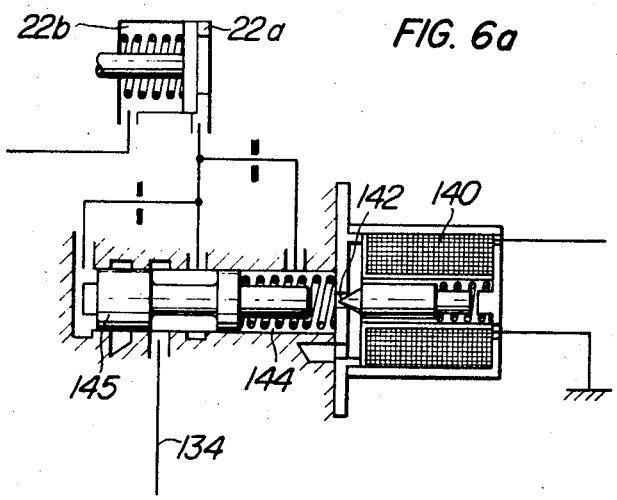
FIG. 6a is a diagrammatic view showing another partial modification of the arrangement shown in FIG. 3, in which a fluid pressure regulating valve is combined with the solenoid operated control valve for controlling the rate of increase in the fluid pressure supplied to one of the hydraulic servos.
Figure 6B:
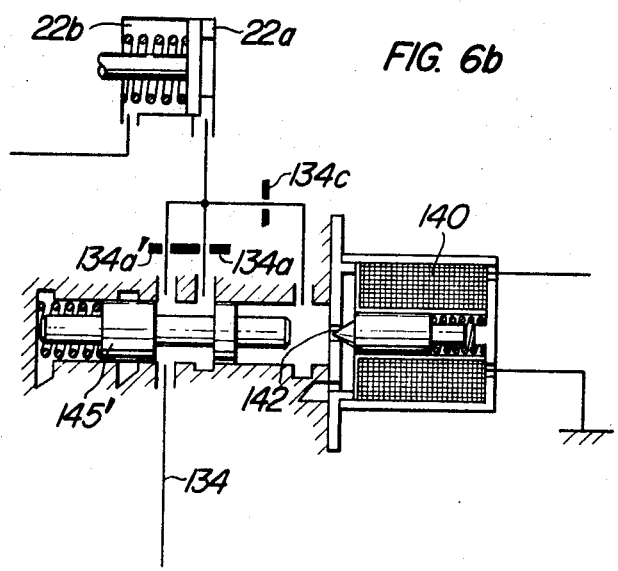
FIG. 6b is a diagrammatic view showing a further partial modification of the arrangement shown in FIG. 3, in which an orifice control valve is combined with the solenoid operated control valve for controlling the rate of increase in the fluid pressure supplied to one of the hydraulic servos.

In a modification shown in FIG. 6a, a fluid pressure regulating valve 145 is placed in the fluid passage 134 leading to the hydraulic servo for the front brake band 22. In this arrangement, a variation in the fluid pressure in a valve chamber 144 due to the on-off of the shift shock control solenoid 140 is utilized to control the rate of increase in the fluid pressure supplied to the servo. By this arrangement, delicate control of the rate of increase in the fluid pressure can be attained compared with the control solely with the orifice shown in FIG. 5. In another modification shown in FIG. 6b, an orifice control valve 145' is placed in the fluid passage 134 leading to the hydraulic servo for the front brake band 22 and is responsive to the on-off operation of the shift shock control solenoid 140 to change over orifices 134a and 134a' to attain a required increase in the servo fluid pressure. The orifice control valve 145' is in the illustrated position when the shift shock control solenoid 140 is in the de-energized state, and in this position of the valve 145', fluid is supplied to the apply side 22a of the servo for the front brake band 22 through both the orifices 134a and 134a'. When the solenoid 140 is energized, the valve 145' is urged to its rightward position with the result that fluid is supplied through the orifice 134a only. Further, fluid leaks through an orifice 134c. Thus, fluid pressure supplied to the servo is reduced compared with that supplied in the de-energized state of the solenoid 140. A rate of increase in the fluid pressure as shown in FIG. 4 can also be obtained by the utilization of these means.

The electrical control section of the system adapted for carrying out various kinds of control as above described by controlling the solenoids 115, 132, 137 and 140 will be described with reference to FIG. 7.

Referring to FIG. 7, the electrical control section includes a throttle position detector 200, an engine r.p.m. detector 220, and an output shaft r.p.m. detector 240 for detecting the parameters required for shift control and fluid pressure control; a 1-2 shift discriminating circuit (D) 300, a 1-2 shift discriminating circuit (L) 300', a 2-3 shift discriminating circuit 320, and a discriminating circuit 340 for carrying out necessary computations on the signals supplied from the detectors and feedback circuits 310, 310' and 330 associated with the respective discriminating circuits 300, 300' and 320; a timing controller including an N(P)-R shift timing control circuit 420a, a 3-2 downshift timing control circuit 420b, a 2-3 upshift timing control circuit 420c and a 1-2 upshift timing control circuit 420d for controlling the shift shock solenoid 140; amplifiers 450, 460, 470 and 480 for amplifying the signals to a level sufficient to energize the respective solenoids 132, 115, 137 and 140; a shift position switch 260; a reference voltage supply 350; and a power regulator 700 for regulating the voltage supplied from the positive terminal of a battery. The positive terminal of the battery is connected through an ignition switch and a fuse to the power regulator 700 which distributes the power to the circuits above described by regulating the battery voltage to a voltage level suitable for the control of these circuits.

The shift position switch 260 comprises a movable contact strip 261 arranged for interlocking operation with the shift lever disposed adjacent to the driver's seat and a plurality of stationary contacts, and the battery voltage appears at output leads 265, 266, 267 and 268 depending on the R, D, 2 and L positions respectively of the manual valve 120.

Figure 8:
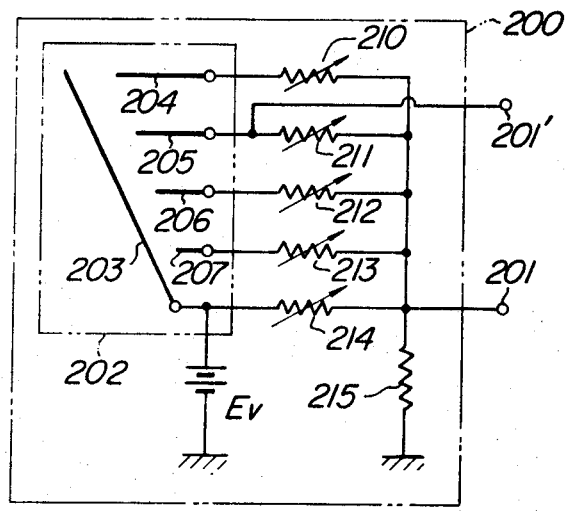
FIG. 8 is a circuit diagram showing the structure of a throttle position detector preferably used in the electrical control section.

The throttle position detector 200 has a structure as shown in FIG. 8. The throttle position detector 200 includes a throttle position detecting means 202 in the form of a multi-contact switch which is responsive to the position of the throttle valve in the carburetor or responsive to the actuation of the accelerator pedal. This switch may respond to a mechanical displacement representative of the negative pressure in the air intake manifold inasmuch as it is an engine torque responsive signal detecting means. The multi-contact switch 202 is provided with a movable contact 203 and a plurality of stationary contacts 204, 205, 206 and 207 and is so constructed that the movable contact 203 is successively brought into contact with the stationary contacts 204, 205, 206 and 207 as the opening $S_e$ of the throttle valve is successively increased to $S_{e(1)}$, $S_{e(2)}$, $S_{e(3)}$ and $S_{e(4)}$. The stationary contacts 204, 205, 206 and 207 and the movable contact 203 are connected with one end of the respective variable resistors 210, 211, 212, 213 and 214. The stationary contact 205 is further connected with an output terminal 201' and the movable contact 203 is connected with the power supply of voltage $E_V$. The variable resistors 210, 211, 212, 213 and 214 are grounded at the other end through a resistor 215, and the junction point between these variable resistors and the resistor 215 is connected with an output terminal 201. The variable resistor 214 is so adjusted that a voltage $E_{(0)}$ appears at the output terminal 201 when $S_e = S_{e(0)}$ due to the full closure of the throttle valve in the carburetor. Then, when the throttle valve opening $S_e$ is increased to $S_{e(1)}$, the movable contact 203 engages solely with the stationary contact 204. The variable resistor 210 is so adjusted that the output appearing at the output terminal 201 in such a position of the switch 202 is given by $[R/(R_1 \mathbin{/\mkern-6mu/} R_s + R)]E = E_{(1)}$, where $R$, $R_1$ and $R_s$ are the resistances of the resistor 215, variable resistor 210 and variable resistor 214 respectively and $R_1 // R_b$ is the resistance given when the variable resistors 210 and 214 are connected in the circuit in parallel with each other. Similarly, the variable resistors 211, 212 and 213 are so adjusted that the outputs appearing at the output terminal 201 in response to the throttle valve openings of $S_{e(2)}$, $S_{e(3)}$ and $S_{e(4)}$ are given by $E_{(2)}$, $E_{(3)}$ and $E_{(4)}$ respectively. Thus, the voltages $E_{(0)}$, $E_{(1)}$, $E_{(2)}$, $E_{(3)}$ and $E_{(4)}$ appear at the output terminal 201 in response to the throttle valve opening $S_e$ of $S_{e(0)}$, $S_{e(1)}$, $S_{e(2)}$, $S_{e(3)}$ and $S_{e(4)}$ respectively. In other words, a stepped signal voltage $E_{(N)}$ (N = 0, 1, 2, 3, 4) appears at the output terminal 201 depending on the throttle valve opening. This signal voltage is called hereinafter a throttle position signal $E_\theta$. The switch 202 is shown as having four stationary contacts, but it is apparent that the number of stationary contacts may be increased when it is desired to obtain a more complex stepped signal. The voltage $E_V$ appears at the output terminal 201' when the throttle valve opening $S_e$ is $S_{e(2)}$ and over. This voltage is called hereinafter a preset throttle opening signal.

Figure 9A:
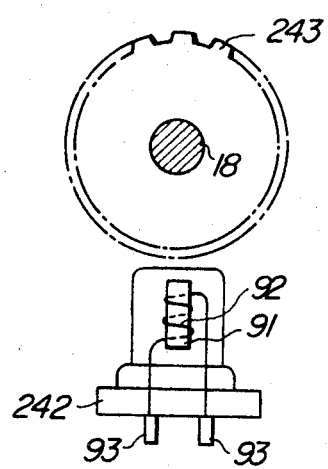
FIGS. 9a and 9b are a side elevation view and a front elevation view respectively of an output shaft r.p.m. detector preferably used in the electrical control section.
Figure 9B:
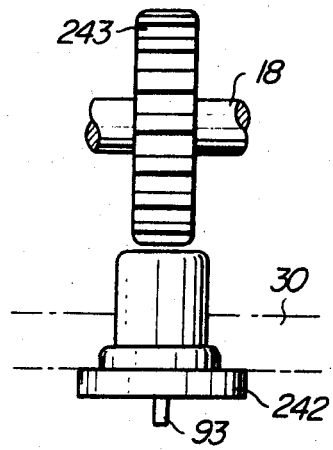

The output shaft r.p.m. detector 240 is connected to a D-A converter 250. The structure and operation of the output shaft r.p.m. detector 240 will be described with reference to FIGS. 9a and 9b. The output shaft r.p.m. detector 240 comprises an r.p.m. detecting means 242 mounted on the transmission housing 30 and a toothed disc 243 secured to the output shaft 18 of the transmission. Suppose that the number of teeth of the toothed disc 243 is N, then the r.p.m. detecting means 242 detects an a.c. voltage signal S having a frequency which is N times the number of revolutions n of the output shaft 18. Thus, $S = n \times N$. Knowing the number of revolutions n of the output shaft 18 enables the speed of the vehicle to be known. As seen in a side elevation in FIG. 9a, the toothed disc 243 which is secured at its center of rotation to the output shaft 18 is a disc-plate of magnetic material having N equally spaced teeth formed along its circumference, and the r.p.m. detecting means 242 is mounted on the transmission housing 30 at a position closely adjacent to the toothed disc 243 in the diametral direction of the latter. The r.p.m. detecting means 242 is composed of a permanent magnet 91 and a coil 92 wound around the magnet 91. The permanent magnet 91 and the coil 92 are housed in a suitable casing of non-magnetic material and the casing is mounted on the transmission housing 30 so that one end of the permanent magnet 91 is disposed in close proximity to the outer periphery of the toothed disc 243. As the tooth portion of the toothed disc 243 passes through the magnetic field of the permanent magnet 91 due to the rotation of the toothed disc 243, a variation takes place in the leakage flux of the permanent magnet 91 so that an electromotive force is produced in the coil 92. One complete rotation of the toothed disc 243 produces N voltage pulses, and as described previously, a voltage signal at an a.c. voltage S having a frequency $n \times N$ is obtained when the output shaft 18 rotates at a number of revolutions n per unit time. This voltage signal appears across output terminals 93. It will be apparent for those skilled in the art that the detection of the speed of the vehicle can be attained by various other methods including mounting a small-sized generator in coaxial relation with the driven gear connected to the speed meter and detectinG the output from the generator.

Figure 10:
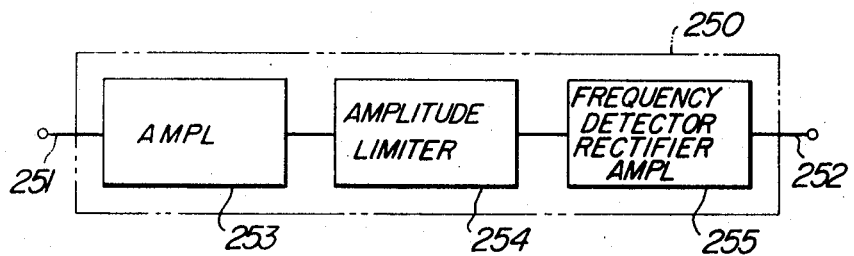
FIG. 10 is a block diagram showing the structure of a D-A converter preferably used in the electrical control section and connected with the output shaft r.p.m. detector for delivering a signal representative of the r.p.m. of the output shaft.

The output voltage signal S delivered from the output shaft r.p.m. detector 240 is applied through a lead 251 to the D-A converter 250. The D-A converter 250 converts the a.c. signal or digital signal S into a d.c. signal or analog signal. The D-A converter 250 has a structure as shown in FIG. 10. The input voltage signal S is applied by the lead 251 to an amplifier 253 in which the amplitude of the signal is increased. An amplitude limiter 254 limits the amplitude of the signal to a fixed value. A frequency detecting, rectifying and amplifying circuit 255 converts the a.c. voltage into a d.c. voltage which is then led out by a lead 252. This voltage is proportional to the r.p.m. of the output shaft 18 and will hereinafter be called an output shaft r.p.m. signal or vehicle speed signal $E_n$.

Figure 11:
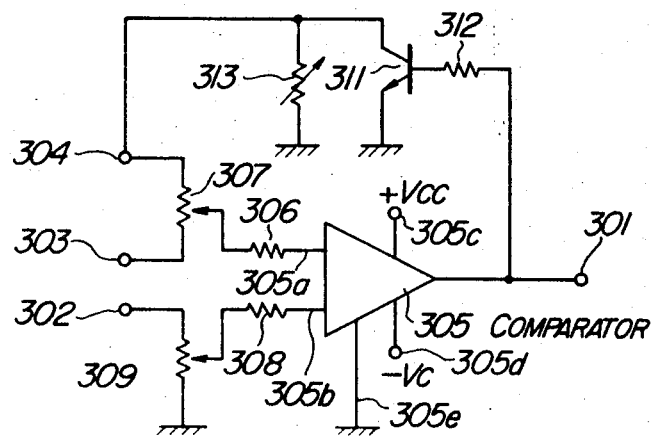
FIG. 11 is a circuit diagram showing the structure of a discriminating circuit and an associated feedback circuit preferably used in the electrical control section for generating a shift control signal.

The 1-2 shift discriminating circuit (D) 300 and the associated feedback circuit 310 have a structure as shown in FIG. 11. The discriminating circuit 300 includes a comparator 305 of any suitable type presently commercially available such as those sold under the trade names of μ Pc 71 by Nippon Electric Co., Ltd. or of SN72710N by Texas Instruments Co., Ltd. An input resistor 306 is connected at one end to one of the input terminals 305a of the comparator 305 and at the other end to the movable arm of a variable resistor 307. The variable resistor 307 is connected across the input terminals 303 and 304 of the discriminating circuit 300. An input resistor 308 is connected at one end to the other input terminal 305b of the comparator 305 and at the other end to the movable arm of a variable resistor 309. The variable resistor 309 is connected at one end to the input terminal 302 of the discriminating circuit 300 and is grounded at the other end. Terminals 305c, 305d and 305e connect the comparator 305 to the positive terminal of the power supply, to the negative terminal of the power supply and to ground respectively. The feedback circuit 310 is composed of a transistor 311, a resistor 312 and a variable resistor 313. The transistor 311 has its emitter grounded and its base connected to the output lead 301 of the discriminating circuit 300 through the resistor 312. The collector of the transistor 311 is connected to one end of the variable resistor 313, and this junction point is connected to the input terminal 304 of the discriminating circuit 300. The movable arm of the variable resistor 313 is grounded.

In operation, assuming that a voltage or 1 appears on the output lead 301 when no signal is applied to the input terminals 302 and 303 of the discriminating circuit 300, the transistor 311 in the feedback circuit 310 is conducting due to the supply of base current through the resistor 312 and the input terminal 304 is substantially grounded. Then, when an output shaft r.p.m. signal $E_n$ and a throttle position signal $E_\theta$ are applied to the respective input terminals 303 and 302 of the discriminating circuit 300, a voltage $E_n' = [R_b/(R_a + R_b)] \cdot E_n$ appears at the movable arm of the variable resistor 307, where $R_a$ is the resistance between the input terminal 303 and the movable arm of the variable resistor 307, and $R_b$ is the resistance between the movable arm of the variable resistor 307 and the collector of the transistor 311 in the feedback circuit 310. A voltage $E_\theta 4' = [R_e/(R_d + R_e)] \cdot E_\theta$ appears at the movable arm of the variable resistor 309, where $R_d$ is the resistance between the input terminal 302 and the variable arm of the variable resistor 309, and $R_e$ is the resistance between the movable arm of the variable resistor 309 and ground. Thus, the voltage $E_n'$ is applied to the input terminal 305a of the comparator 305 through the input resistor 306, and the voltage $E_\theta{}'$ is applied to the input terminal 305b of the comparator 305 through the input resistor 308. The comparator 305 compares the voltage $E_\theta'$ with the voltage $E_n'$. When $E_n' - E_\theta'$ is positive, no output signal or 0 is delivered from the comparator 305, while when $E_n' - E_\theta'$ is negative, an output signal or 1 is delivered from the comparator 305 to appear on the output lead 301. The resistors 306 and 308 are protective resistors which protect the comparator 305 against large inputs that may be applied to the input terminals.

Figure 12:
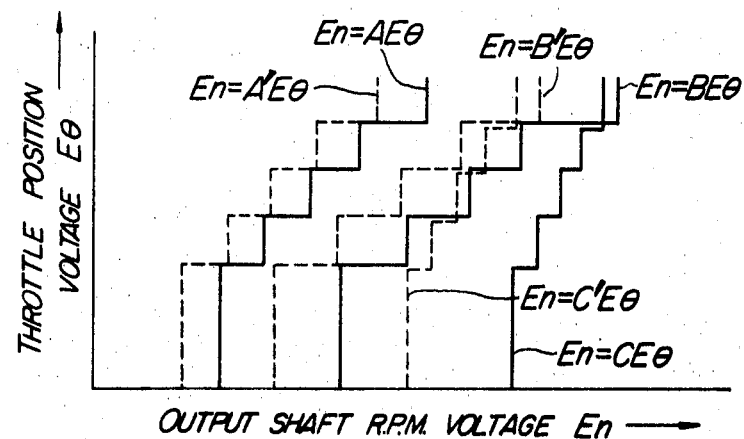
FIG. 12 is a chart showing the relation between the output shaft r.p.m. signal and the throttle position signal depending on which, the output from the discriminating circuit is determined.

When no output signal or 0 appears on the output lead 301 of the discriminating circuit 300, due to $E_n' - E_\theta' > 0$, no base current is supplied to the transistor 311 through the resistor 312 in the feedback circuit 310, it is possible to seek the relation $E_n = AE_\theta$ age $E_n'' = [(R_b + R_c)/(R_a + R_b + R_c)] \cdot E_n$ is applied to the input terminal 305a of the comparator 305, where $R_c$ is the resistance of the variable resistor 313. Thus, $E_n'' > E_n'$ for the same value of $E_n$. It will be understood therefore that the output appearing on the output lead 301 of the comparator 305 changes from 0 to 1 at a lower value of $E_n$ or at a lower vehicle speed than when the output changes from 1 to 0. In other words, the feedback circuit 310 acts to vary the degree of modification of the output shaft r.p.m. signal $E_n$ by the resistors depending on the appearance of 0 or 1 on the output lead 301 of the discriminating circuit 300 thereby varying the conditions of discrimination by the discriminating circuit 300. This method is effective to stabilize the signal appearing on the output lead 301 and to prevent undesirable hunting between 0 and 1. By suitably selecting the resistances of the variable resistors 307, 309 and 313 in the 1–2 shift discriminating circuit (D) 300 and the associated feedback circuit 310, it is possible to seek the relation $E_n = AE_\theta$ between the output shaft r.p.m. signal $E_n$ and the throttle position signal $E_\theta$ when the output appearing on the output lead 301 changes from 1 to 0, and the relation $E_n = A'E_\theta$ between these two signals when the output appearing on the output lead 301 changes from 0 to 1. These relations are shown in FIG. 12. It will be seen from FIG. 12 that the output appearing on the output lead 301 changes from 1 to 0 or no output voltage appears on the output lead 301 when $E_n$ is increased to make a shift into the region on the right-hand side of the line representing the relation $E_n = AE_\theta$. The output appears on the output lead 301 again when $E_n$ is decreased while 0 is appearing on the output lead 301 to such an extent that the relation $E_n \leq A'E_\theta$ holds.

The output signal delivered from the discriminating circuit 300' receiving the throttle position signal $E_\theta$ AND circuit 500 which receives another input signal from an OR circuit 501. A switching circuit (D) 273 applies its output signal to one of the two input terminals of the OR circuit 501, while a switching circuit (2) 274 applies its output signal to the other input terminal of the OR circuit 501. These switching circuits 273 and 274 are switching relays employing transistors therein and deliver an output signal of 1 when the shift lever actuating the manual valve 120, hence the shift position switch 260 takes its D and 2 positions respectively. These switching circuits 273 and 274 deliver no output signal or 0 in the other positions of the shift position switch 260. Thus, the OR circuit 501 delivers an output signal or 1 in the D and 2 positions while it delivers no output signal or 0 in the other positions of the shift position switch 260. Therefore, the AND circuit 500 delivers an output signal or 1 in response to the application of 1 from the 1–2 shift disciminating circuit 300 in the D and 2 positions only of the shift position switch 260, and this output signal is applied through an OR circuit 502 to the amplifier 450, thence to the 1–2 shift solenoid 132 for energizing same. The AND circuit 500 and the OR circuits 501 and 502 are of the construction well-known in the art, and the amplifier 450 amplifies the output signal from the OR circuit 502 to a level enough to energize the 1–2 shift solenoid 132.

The 1–2 shift discriminating circuit (L) 300' and the associated feedback circuit 310' have a structure and function similar to those of the 1–2 shift discriminating circuit (D) 300 and the associated feedback circuit 310. However, the input terminals of the discriminating circuit 300' receiving the throttle position signal $E_\theta$ and the output shaft r.p.m. signal $E_n$ are reversed from the case of the discriminating circuit 300 so as to seek the relation $E_n = CE_\theta$ between these two signals when the output appearing on an output lead 301' changes from 0 to 1 and the relation $E_n = C'E_\theta$ between these two signals when the output appearing on the output lead 301' changes from 1 to 0. These relations are also shown in FIG. 12. Thus, the 1–2 shift discriminating circuit (L) 300' delivers an output signal or 1 when $E_n \geq CE_\theta$, whereas the 1–2 shift discriminating circuit (D) 300 delivers no output signal or 0 when $E_n \geq AE_\theta$. The output signal delivered from the 1–2 shift discriminating circuit 300' is applied as one of inputs to an AND circuit 503 of known construction which receives another input signal from a switching circuit (L) 275. The switching circuit (L) 275 delivers an output signal or 1 in the L position of the transmission shift lever and no output signal or 0 in any other positions of the shift lever. Therefore, the 1–2 shift discriminating circuit (L) 300' delivers an output signal or 1 when $E_n \geq CE_\theta$ and the switching circuit (L) 275 delivers an output signal or 1 in the L position of the shift lever only. In response to the application of these two signals, the AND circuit 503 delivers an output signal or 1. This signal is applied to the amplifier 450 through the OR circuit 502 for energizing the 1–2 shift solenoid 132. It will be seen that two discriminating circuits are provided to produce the signal for energizing the 1–2 shift solenoid 132 in the different positions of the transmission shift lever. These two disciminating circuits are required so that the 1–2 shift solenoid 132 is on in the D position-1st speed, 2 position-1st speed and L position-2nd speed and off in the position-2nd speed, 2 position-2nd speed and L position-1st speed as shown in Table 1. However, it is apparent that any other suitable means may be employed to reverse the on and off state of the 1–2 shift solenoid 132 in the first and second speeds in the manner above described. According to the present invention, the range of the first speed in the D and 2 positions can be varied greatly from the range of the first speed in the L position as seen in FIG. 12 by virtue of the provision of the two discriminating circuits.

The function of the 2–3 shift discriminating circuit 320 and the associated feedback circuit 330 is similar to that of the 1–2 shift discriminating circuit (D) 300 and the associated feedback circuit 310 described previously. The 2–3 shift discriminating circuit 320 computes the relation $E_n = BE_\theta$ between the output shaft r.p.m. signal $E_n$ and the throttle position signal $E_\theta$ when the output appearing on the output lead 321 changes from 1 to 0 and the relation $E_n = B'E_\theta$ between these two signals when the output appearing on the output lead 321 changes from 0 to 1. The output signal having appeared on the output lead 321 disappears or changes from 1 to 0 when the output shaft r.p.m. signal $E_n$ is increased to such an extent that the relation $E_n \geqq BE_\theta$ is now satisfied. The output signal appears on the output lead 321 again or changes from 0 to 1 when the output shaft r.p.m. signal $E_n$ is decreased to such an extent that the relation $E_n \leqq B'E_\theta$ is now satisfied. The output signal from the 2–3 discriminating circuit 320 is applied to the amplifier 460 for energizing the 2–3 shift solenoid 137.

The line pressure control solenoid 115 is controlled by the NAND logic between the output signal from the discriminating circuit 340 for carrying out an arithmetic operation on the engine r.p.m. and the output signal from the 1–2 shift discriminating circuit (D) 300. The engine r.p.m. detector 220 applies its output signal to the discriminating circuit 340 through a D-A converter 230. The engine r.p.m. detector 220 has a structure similar to that of the output shaft r.p.m. detector 240 described previously and comprises a toothed disc 243' mounted on the cover 2' of the pump impeller 2 connected directly with the engine crankshaft 1 and an r.p.m. detecting means 242' mounted on the torque converter housing 30' as shown in FIG. 1 for delivering an a.c. signal or digital signal at a frequency proportional to the r.p.m. of the engine. The D-A converter 230 converts this a.c. signal into a d.c. signal or engine r.p.m. signal $E_e$ proportional to the r.p.m. of the engine. The r.p.m. detecting means 242' and D-A converter 230 have the same structure as the r.p.m. detecting means 242 and D-A converter 250.

Figure 13:
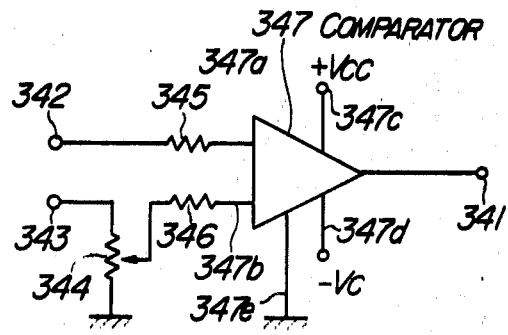
FIG. 13 is a circuit diagram showing the structure of another discriminating circuit which compares a signal representative of the r.p.m. of the engine with a reference voltage and delivers its output depending on the relation therebetween.

The discriminating circuit 340 for carrying out the arithmetic operation on the engine r.p.m. has a structure similar to that of the 1–2 shift discriminating circuit (D) 300 as shown in FIG. 13. A constant reference voltage $E_0$ is applied to one input terminal 342 of the discriminating circuit 340 from the reference voltage supply 350, while the engine r.p.m. signal $E_e$ is applied to the other input terminal 343 of the discriminating circuit 340. The reference voltage $E_0$ is applied through an input resistor 345 so that a modified voltage $E_0'$ is applied to one input terminal 347a of a comparator 347, while the engine r.p.m. signal $E_e$ is applied through a variable resistor 344 and an input resistor 346 so that a modified voltage $E_e'$ is applied to the other input terminal $347_b'$ of the comparator 347. The comparator 347 compares the signal $E_e'$ with the signal $E_0'$ and an output signal or 1 appears on an output lead 341 when $E_e' \geqq E_0'$, while no output signal or 0 appears on the output lead 341 when $E_e' < E_0'$. The voltage $E_0' \approx E_0$ is a reference voltage corresponding to a predetermined engine r.p.m. $n_{E_0}$. Therefore, an output signal or 1 is delivered from the comparator 347 when the engine r.p.m. $n_E \geqq n_{E_0}$, while no output signal or 0 appears when $n_E < N_{E_0}$.

The output signal from the discriminating circuit 340 is applied to one input terminal of a NAND circuit 360 which receives another input from the 1–2 shift discriminating circuit (D) 300. The NAND circuit 360 delivers no output signal or 0 when both these input signals are 1, and an output signal or 1 is delivered from the NAND circuit 360 to appear on an output lead 361 when the above condition is not satisfied. The NAND circuit 360 applies its output signal to the amplifier 470 in which the signal is amplified to be applied to the line pressure control solenoid 115 for energizing same. The two input signals are applied to the NAND circuit 360 when the vehicle is running at a low speed corresponding to the first speed in the D or 2 position of the shift lever for the transmission, hence in the D or 2 position of the manual valve 120 and when the engine r.p.m. $n_E$ lies in the range $n_E \geqq n_E$. Thus, when the vehicle is running forwards at a low speed in the D, 2 or L position of the shift lever, and the engine r.p.m. $n_E$ lies in the range $n_E \geqq n_E$, the line pressure control solenoid 115 is de-energized and the line pressure produced by the pressure regulator valve 105 is the medium high fluid pressure $P_{LH}$. In the other forwardly driving conditions of the vehicle, the line pressure control solenoid 115 is energized and the line pressure produced by the pressure regulator valve 105 is the constant low fluid pressure $P_{LL}$. In the N, P or R position of the shift lever, the line pressure is increased by the action of the relay valve 150. The vehicle is running backwards at a low speed in the R position and is in its stopped state in the P position. When the relation $n_E \geqq n_{E_0}$ is satisfied in such a position of the shift lever, the line pressure control solenoid 115 is de-energized and the line pressure is set at the high fluid pressure $P_{HH}$ which is higher than the fluid pressure $P_{LH}$. In the other conditions, the line pressure is set at the medium low fluid pressure $P_{HL}$ which is higher than the fluid pressure $P_{LL}$. In this manner, a high line pressure taking into consideration the torque multiplying action of the torque converter can be supplied to the hydraulic servos for the clutches and brake bands so as to provide an increased engaging force in the range in which the speed of the vehicle is low and the r.p.m. of the engine is high, hence the engine torque is high, while a suitable low line pressure can be supplied to the hydraulic servos so as to prevent power losses including losses occurring in the oil pump and other elements in the medium and high speed ranges since the torque multiplying action of the torque converter is lost in such ranges due to the fact that the torque converter acts substantially as a hydraulic coupling. Further, a low line pressure is produced in the range, in which the vehicle is running at a lower speed or is stopped and the r.p.m. of the engine is low, so as to alleviate the shock imparted to the transmission during a shift from the N position to the D or R position.

The shift shock control solenoid 140 for carrying out the shift shock alleviating action which is an important feature of the present invention is controlled by the timing controller which is composed of a plurality of shift timing control circuits 420a to 420d each having a delay circuit therein, an AND circuit 442, and OR circuits 440 and 444. As described in detail in the description relating to the hydraulic control section of the system, the shift shock control solenoid 140 controls the rate of fluid pressure supply to the hydraulic servos during a shift so as to alleviate the shock caused by the shift and operates for a limited period of time during the N (or P) to R shift, 3 to 2 downshift, 2 to 3 upshift and 1 to 2 upshift. The operation of the timing controller for producing a signal for energizing the shift shock control solenoid 140 for a limited period of time will now be described.

N (or P)-R shift

Figure 14:
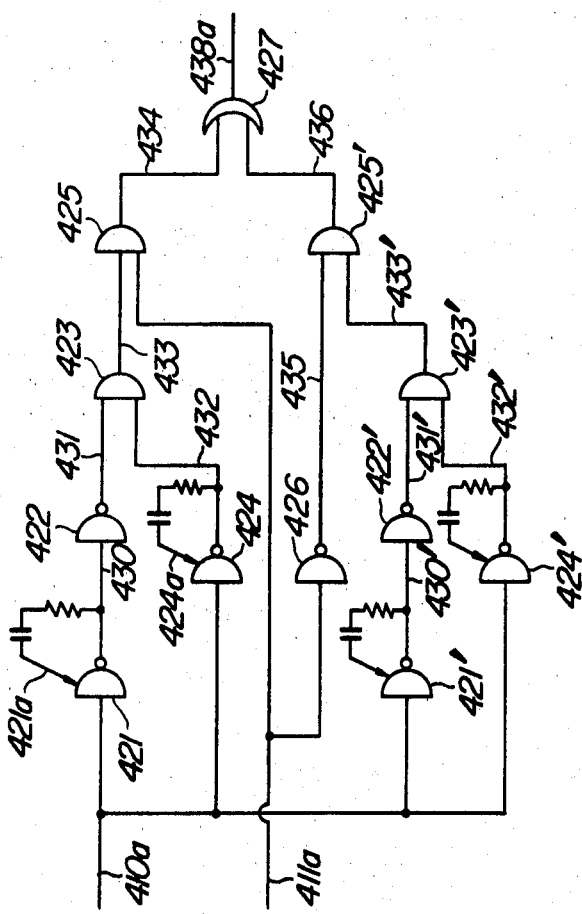
FIG. 14 is a circuit diagram showing the structure of a timing control circuit preferably used in the electrical control section.
Figure 15:
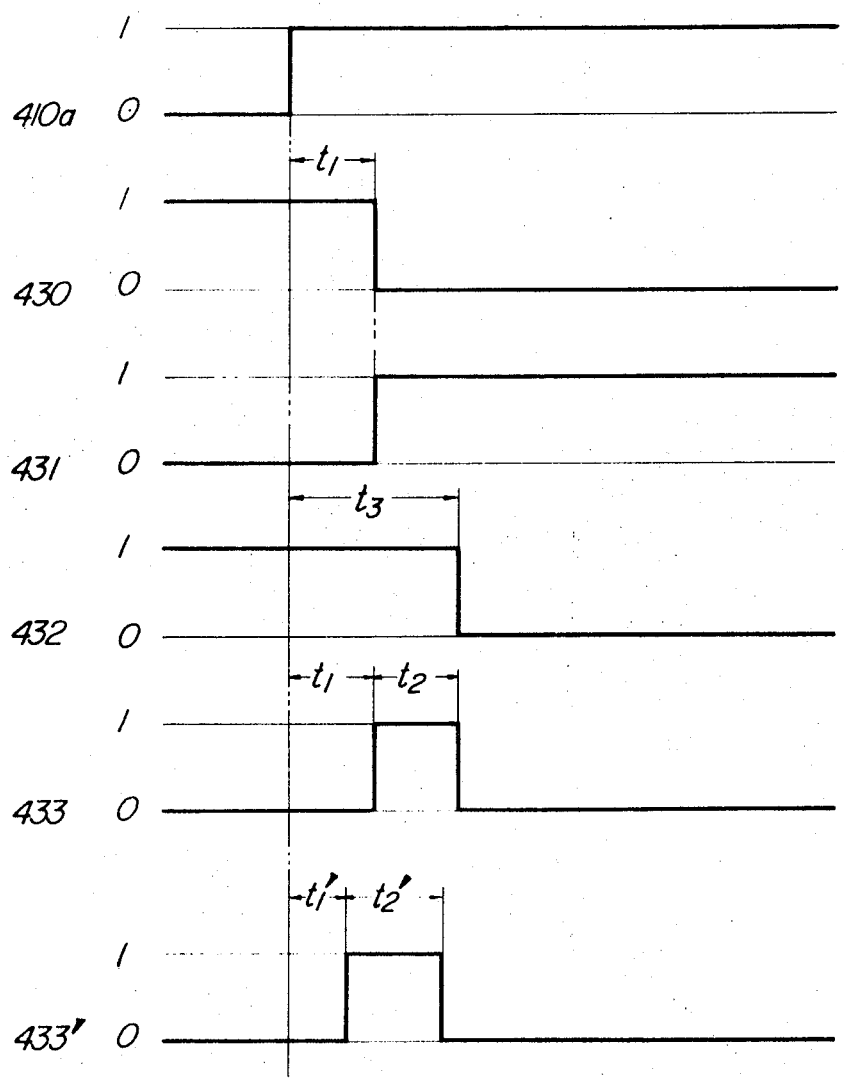
FIG. 15 is a graphic illustration of input and output waveforms appearing at various parts of the timing control circuit.

FIG. 14 shows the structure of the N(P)-R shift timing control circuit 420a which controls the shift shock alleviating action of the shift shock control solenoid 140 during a shift of the shift lever from the N or P position to the R position. A switching circuit (R) 272 applies its output to one input terminal of the timing control circuit 420a by a lead 410a. The switching circuit (R) 272 is a transistor switching relay of well-known construction and delivers an output signal or 1 when the shift lever is in the R position, while it delivers no output signal or 0 in any other positions of the shift lever. A switching circuit ($\theta$) 271 applies its output to the other input terminal of the control circuit 420a by a lead 411a. The switching circuit ($\theta$) 271 operates in response to the application of the output signal or preset throttle opening signal from the output terminal 201' of the throttle position detector 200 and delivers an output signal or 1 when the throttle opening is $S_{e(2)}$ and over, while it delivers no output signal or 0 when the throttle opening is smaller than $S_{e(2)}$. The timing control circuit 420a includes a NAND circuit 421 provided with an expander terminal 421 a to which a delay circuit of well-known construction composed of a capacitor and a resistor is connected. Thus, the signal appearing on an output lead 430 leading out from the output terminal of the NAND circuit 421 changes from 1 to 0 with a delay time $t_1$ as shown in FIG. 15 relative to a change from 0 to 1 in the input applied to the input terminal by the lead 410a due to the N(P)-R shift. An output signal or 1 appears on an output lead 431 leading out from the output terminal of a NAND circuit 422 when the output signal applied from the NAND circuit 421 changes from 1 to 0. A NAND circuit 424 having an expander terminal 424a is similar to the NAND circuit 421. Thus, the signal appearing on an output lead 432 leading out from the output terminal of the NAND circuit 424 changes from 1 to 0 with a delay time $t_3$ ($t_3 > t_1$) relative to a change from 0 to 1 in the input applied to the input terminal by the lead 410a. The signals delivered from the NAND circuits 422 and 424 are applied by the respective leads 431 and 432 to an AND circuit 423 which takes the logical product of these two input signals. Thus, the signal appearing on an output lead 433 leading out from the output terminal of the AND circuit 423 changes from 0 to 1 with a delay time $t_1$ relative to a change from 0 to 1 in the input applied by the lead 410a and then changes from 1 to 0 with a delay time $t_2$ ($= t_3 - t_1$) as seen in FIG. 15.

NAND circuits 421', 422' and 424' and an AND circuit 423' in FIG. 14 constitute a timing control signal generating means which is entirely similar to that above described. Thus, the signal appearing on an output lead 433' leading out from the output terminal of the AND circuit 423' changes from 0 to 1 with a delay time $t_1'$ relative to a change from 0 to 1 in the output applied by the lead 410a and then changes from 1 to 0 with a delay time $t_2'$ as seen in FIG. 15.

An AND circuit 425 takes the logical product of the timing signal applied from the AND circuit 423 by the lead 433 and the input signal applied from the switching circuit ($\theta$) 271 by the lead 411a. Since the switching circuit ($\theta$) 271 delivers its output signal or 1 when the throttle opening is $S_{e(2)}$ and over, an output signal appears from the AND circuit 425 on an output lead 434 in response to the application of an input signal or 1 from the AND circuit 423 by the lead 433. Since no signal or 0 appears on the lead 411a when the throttle opening is smaller than $S_{e(2)}$, no output signal or 0 is delivered from the AND circuit 425 irrespective of the application of 1 or 0 from the AND circuit 423. A NAND circuit 426 delivers an output signal or no output signal in response to the application of 0 or 1 by the lead 411a. An AND circuit 425' takes the logical product of the timing signal applied from the AND circuit 423' by the lead 433' and the signal applied from the NAND circuit 426 by a lead 435. Since no signal or 0 appears on the lead 411a when the throttle opening is smaller than $S_{e(2)}$, the NAND circuit 426 applies its output signal to the AND circuit 425' which therefor delivers an output signal when the AND circuit 423' applies its output signal or 1 thereto by the lead 433'. When the throttle opening is $S_{e(2)}$ and over, no output signal or 0 is delivered from the AND circuit 425' to appear on an output lead 436 irrespective of the application of 1 or 0 from the AND circuit 423'. An OR circuit 427 takes the logical sum of the input signals applied from the AND circuits 425 and 425' and delivers an output signal or 1 in response to the application of 1 from either AND circuit. Therefore, the input signal applied from the AND circuit 425 appears on an output lead 438 a when the throttle opening is $S_{e(2)}$ and over, while the input signal applied from the AND circuit 425' appears on the output lead 438a when the throttle opening is smaller than $S_{e(2)}$. This means that the timing control signal can be selected by the throttle position signal which is one of the signals representative of the running conditions of the vehicle.

3-2 downshift

The shift shock control solenoid 140 is energized for a limited period of time during a downshift from the third to second speed too as in the case of the N(P)-R shift. The 3-2 downshift timing control circuit 420b has a structure entirely similar to that of the N(P)-R shift timing control circuit 420a. The output signal from the switching circuit ($\theta$) 271 is applied to one of the input terminals of the timing control circuit 420b by a lead 411b, and the output signal from the 2-3 shift discriminating circuit 320 is applied to the other input terminal by a lead 410b. Thus, a timing control signal which changes from 0 to 1 and then 1 to 0 appears on an output lead 438b of the timing control circuit 420b in response to the change from 0 to 1 in the input applied from the 2-3 shift discriminating circuit 320 during the 3-2 downshift.

2-3 upshift

The shift shock control solenoid 140 is energized for a limited period of time during an upshift from the second to third speed, and the 2-3 upshift timing control circuit 420c delivers a timing control signal in a manner similar to that described above. The output signal from the switching circuit ($\theta$) 271 is applied to one of the input terminals of the timing control circuit 420c by a lead 411c, and the output signal from the 2-3 shift discriminating circuit 320 is applied by a lead 405 to a NAND circuit 401 from which an inverted signal is applied to the other input terminal of the timing control circuit 420c by a lead 410c. Therefore, the signal applied to the latter input terminal of the timing control circuit 420c by the lead 410c changes from 0 to 1 relative to a change from 1 to 0 in the input applied from the 2-3 shift discriminating circuit 320 during the 2-3 upshift, and a timing control signal which changes from 0 to 1 and then 1 to 0 appears on an output lead 438c of the timing control circuit 420c as in the case of the N(P)-R shift. The OR circuit 440 takes the logical sum of the 3-2 downshift timing control signal applied from the 3-2 downshift timing control circuit 420b by the lead 438b and the 2-3 upshift timing control signal applied from the 2-3 upshift timing control circuit 420c by the lead 438c. The AND circuit 442 takes the logical product of the 2-3 upshift timing control signal or 3-2 downshift timing control signal applied from the OR circuit 440 by a lead 441 and the signal applied from the switching circuit (D) 273. Thus, a timing control signal appears on an output lead 443 of the AND circuit 442 only when the shift lever for the transmission is in the D position.

1-2 upshift

During an upshift from the first to second speed, the shift shock control solenoid 140 is controlled in a manner similar to that above described. The 1-2 upshift timing control circuit 420d has a structure entirely similar to that of the N(P)-R shift timing control circuit 420 and delivers a 1-2 upshift timing control signal. The output signal from the switching circuit ($\theta$) 271 is applied to one of the input terminals of the 1-2 upshift timing control circuit 420d by a lead 411d, and the output signal from the 1-2 shift discriminating circuit (D) 300 is applied through the AND circuit 500 to a NAND circuit 402 by a lead 406 from which an inverted signal is applied to the other input terminal of the timing control circuit 420d by a lead 410d. Therefore, the signal applied to the latter input terminal of the timing control circuit 420d by the lead 410d changes from 0 to 1 relative to a change from 1 to 0 in the input applied from the 1-2 shift discriminating circuit (D) 300 during the 1-2 upshift, and a timing control signal which changes from 0 to 1 and then 1 to 0 appears on an output lead 438d of the timing control circuit 420d as in the case of the N(P)-R shift. The OR circuit 444 takes the logical sum of the signals applied from the N(P)-R shift timing control circuit 420a, the AND circuit 442 and the 1-2 upshift timing control circuit 420d by the respective leads 438a, 443 and 438d, and an output signal or 1 appears on an output lead 445 of the OR circuit 444 when 1 is applied from anyone of these circuits 420a, 442 and 420d. The output from the OR circuit 444 is amplified by the amplifier 480 to energize the shift shock control solenoid 140.

The AND circuits, NAND circuits and OR circuits used in the timing control circuits described in detail hereinabove may be of well-known construction. In this manner, the shift shock control solenoid 140 is subjected to on-off timing control suitable for the specific shift and the running conditions of the vehicle during such shift and controls the rate of increase in the fluid pressure supplied to the hydraulic servos thereby controlling the engaging timing and the rate of engagement of the brake bands and clutches for ensuring a smooth shift.

The controller for controlling the operation of the shift shock control solenoid 140 employed in the present invention has been so arranged that the preset throttle opening signal indicative of one of the running conditions of the vehicle is utilized to switch the timing control signal over two stages. However, where a more complex control is required, control means of a structure similar to that described may be additionally provided so as to switch the timing control signal over three and more stages. Further, this switch-over signal is not limited to the preset throttle opening signal, and a signal representative of another running condition of the vehicle such as the vehicle speed or temperature of lubricating oil may be utilized in lieu thereof. Furthermore, a simple timing control signal which changes merely from 0 to 1 and then 1 to 0 has been described by way of example, but this signal may change in a more complex manner when so required.

While an embodiment of the present invention and some partial modifications thereof have been described with reference to a three-forward speed and one-reverse speed automatic transmission for the purposes of illustration, it will be apparent for those skilled in the art that various other changes and modifications may be made therein without departing from the scope of the appended claims.

We claim:

1. In an automatic automotive vehicle transmission used for transmitting torque between a driving shaft and a driven shaft, a control system comprising:
   frictional engaging means provided with fluid pressure operated servo means for selective actuation thereof and arranged for the transmission of torque between said driving and driven shafts,
   a source of fluid pressure for supplying fluid under pressure for actuating said frictional engaging means by selective application to said servo means,
   fluid passage means leading from said fluid pressure source to said frictional engaging means,
   fluid passage change-over valve means disposed in said fluid passage means for selectively distributing fluid under pressure to predetermined servo means in said frictional engaging means,
   signal generator means including a signal generator for generating a first electrical signal responsive to at least one of the running conditions of the vehicle,
   fluid pressure control means for controlling the pressure of fluid supplied to said frictional engaging means through said fluid passage change-over valve means, and
   timing control means for generating a second electrical signal and means for controlling the operation timing of said fluid pressure control means in response to the first electrical signal delivered from said signal generator means, whereby said fluid pressure control means is subject to on-off control during a shift from one gear position to another which is followed by a variation in the torque being transmitted between said driving and driven shafts so as to control the fluid pressure supplied to said frictional engaging means thereby ensuring smooth transmission of the torque between said driving and driven shafts during the shift.

2. In an automatic automotive vehicle transmission used for transmitting torque between a driving shaft and a driven shaft, a control system comprising:
   frictional engaging means provided with fluid pressure operated servo means for selective actuation thereof and arranged for the transmission of torque between said driving and driven shafts,
   a source of fluid pressure for supplying fluid under pressure for actuating said frictional engaging means by selective application to said servo means, fluid passage means leading from said fluid pressure source to said frictional engaging means, shift valve means disposed in said fluid passage means for selectively distributing fluid under pressure to predetermined servo means in said frictional engaging means, means for generating an electrical signal responsive to the engine torque, means for generating an electrical signal responsive to the vehicle speed, shift signal computing means for computing the relation between these two electrical signals and for generating a shift signal when the relation between these two signals satisfies a predetermined condition, fluid pressure supply control valve means for allowing leakage of fluid under pressure in said fluid passage means leading to said frictional engaging means through said shift valve means thereby controlling the fluid pressure supplied to said frictional engaging means, and timing control means for generating a timing control signal in response to the output signal delivered from said shift signal computing means for controlling the period of time of the leakage of fluid under pressure from said fluid passage means through said fluid pressure supply control valve means, whereby said fluid pressure supply control valve means controls the rate of increase or decrease relative to time of the pressure of fluid supplied to said frictional engaging means for ensuring smooth transmission of the torque between said driving and driven shafts during a shift fromm one gear position to another.

3. In an automatic automotive vehicle transmission used for transmitting torque between a driving shaft and a driven shaft, a control system comprising:

a first frictional engaging means provided with a fluid pressure operated servo means for establishing a high speed drive ratio between said drivingand driven shafts, a second frictional engaging means provided with a fluid pressure operated servo means having an apply-side chamber and a release-side chamber for establishing a low speed drive ratio between said driving and driven shafts, a source of fluid pressure for supplying fluid under pressure for actuating said frictional engaging means, a plurality of shift valves for selectively distributing fluid under pressure to said frictional engaging means, a first fluid passage leading from one of said shift valves to the apply-side chamber of said fluid pressure operated servo means for said second frictional engaging means, a second fluid passage leading from another said shift valve to the fluid pressure operated servo means for said first frictional engaging means and to the release-side chamber of said fluid pressure operated servo means for said second frictional engaging means, a fluid pressure supply control valve connected to said first and mecond fluid passages for connecting and disconnecting the apply-side servo chamber with the release-side servo chamber of said fluid pressure operated servo means for said second frictional engaging means thereby controlling the fluid pressure supplied to said second frictional engaging means, signal generator means including a signal generator for generating an electrical signal responsive to at least one of the running conditions of the vehicle, and timing control means for generating a timing control signal for controlling the operation timing of said fluid pressure supply control valve in response to the output signal delivered from said signal generator means, whereby said fluid pressure supply control valve controls the fluid pressure supplied to both of said frictionally engaging means during a shift from one gear position to another which is followed by a variation in the drive ratio between said driving and driven shafts so as to ensure a smooth transition from one gear position to another.

4. In an automatic automotive vehicle transmission used for transmitting torque between a driving shaft and a driven shaft, a control system comprising:

a first frictional engaging means provided with a fluid pressure operated servo means for establishing a high speed drive ratio between said driving and driven shafts, a second frictional engaging means provided with a fluid pressure operated servo means having an apply-side chamber and a release-side chamber for establishing a low speed drive ratio between said driving and driven shafts, a source of fluid pressure for supplying fluid under pressure for actuating said frictional engaging means, a plurality of shift valves for selectively distributing fluid under pressure to said frictional engaging means, a first fluid passage leading from one of said shift valves to the apply-side chamber of said fluid pressure operated servo means for said second frictional engaging means, a second fluid passage leading from another said shift valve to the fluid pressure operated servo means for said first frictional engaging means and to the release-side chamber of said fluid pressure operated servo means for said second frictional engaging means, an electromagnetically operated fluid pressure control valve connected with at least one of said first and second fluid passages for allowing leakage of fluid under pressure in said fluid passage, signal generator means including a signal generator for generating an electrical signal responsive to at least one of the running conditions of the vehicle, and timing control means for generating a timing control signal for controlling the operation timing of said electromagnetically operated fluid pressure control valve in response to the output signal delivered from said signal generator means, whereby said electromagnetically operated fluid pressure control valve controls the fluid pressure supplied to said frictional engaging means during a shift from one gear position to another which is followed by a variation in the drive ratio between said driving and driven shafts so as to ensure a smooth transition from one gear position to another.

5. A control system for an automatic transmission as in claim 1, in which said fluid pressure control means comprises:
an electromagnetically operated valve allowing leakage of fluid under pressure in said fluid passage means, and
a valve for regulating the pressure of fluid,
said electromagnetically operated valve and said fluid pressure regulating valve cooperating to control the fluid pressure supplied to said frictional engaging means.

6. A control system for an automatic transmission as in claim 1, in which said fluid pressure control means comprises:
an electromagnetically operated valve for draining fluid in said fluid passage means, and
an orifice control valve,
said electromagnetically operated valve and said orifice control valve cooperating to control the fluid pressure supplied to said frictional engaging means.

7. In a control system for an automatic transmission comprising a plurality of frictional engaging means, each having fluid control means associated therewith for selectively effecting shift changes in torque transmitted between a driving and a driven shaft, an improvement comprising:
fluid pressure modifying means for modulating normal selective changes in the fluid pressure applied to said fluid control means to effect desired shift changes in transmitted torque, and
control means connected to said fluid pressure modifying means for controlling the timing and degree of modulation to effect a smooth change in the transmitted torque through said transmission during said desired shift changes.

B. An improvement as in claim 7 wherein:
said fluid pressure modifying means comprises at least one controllably opened or closed valve in fluid communication between a fluid passage having low fluid pressure during a given shift change and at least one fluid passage leading to a fluid control means having high pressure applied thereto for effecting said given shift,
the rate of increase of pressure in said at least one fluid passage being effectively controllable by opening and closing said valve in response to an applied timing control signal, and
said control means comprises means for detecting an impending shift change and for generating said timing control signal having a predetermined timing and duration with respect to the shift change being effected.

9. An improvement as in claim 8 wherein said valve comprises an orifice and means for closing and opening said orifice electromagnetically.

10. An improvement as in claim 8 wherein said valve comprises a pressure regulating valve and associated means for effecting electromagnetic control thereof.

11. An improvement as in claim 8 wherein said valve is connected between fluid passages leading to two different ones of said fluid control means.

* * * * *